(12) United States Patent
Wang

(10) Patent No.: US 11,113,586 B2
(45) Date of Patent: Sep. 7, 2021

(54) METHOD AND ELECTRONIC DEVICE FOR RETRIEVING AN IMAGE AND COMPUTER READABLE STORAGE MEDIUM

(71) Applicant: BOE TECHNOLOGY GROUP CO., LTD., Beijing (CN)

(72) Inventor: Tingting Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 28 days.

(21) Appl. No.: 16/531,644

(22) Filed: Aug. 5, 2019

(65) Prior Publication Data

US 2020/0242422 A1 Jul. 30, 2020

(30) Foreign Application Priority Data

Jan. 29, 2019 (CN) .......................... 201910089288.7

(51) Int. Cl.
*G06K 9/66* (2006.01)
*G06K 9/68* (2006.01)
*G06N 3/08* (2006.01)
*G06K 9/62* (2006.01)

(52) U.S. Cl.
CPC ............. *G06K 9/66* (2013.01); *G06K 9/6256* (2013.01); *G06K 9/68* (2013.01); *G06N 3/08* (2013.01)

(58) Field of Classification Search
CPC .......... G06K 9/66; G06K 9/68; G06K 9/6256; G06K 9/4628; G06N 3/08; G06N 3/0454; G06T 7/11
See application file for complete search history.

(56) References Cited

U.S. PATENT DOCUMENTS

2017/0193335 A1* 7/2017 Montoro .............. G06N 3/0454
2018/0137404 A1 5/2018 Fauceglia et al.
2018/0239987 A1* 8/2018 Chen .................... G06K 9/4628
(Continued)

FOREIGN PATENT DOCUMENTS

CN 104537393 A 4/2015
CN 106096654 A 11/2016
CN 106682233 A 5/2017
(Continued)

OTHER PUBLICATIONS

Li Zhou et al. (Scene classification using a multi-resolution bag-of-features model) Pub. Date: Aug. 4, 2012 (Year: 2012).*
(Continued)

*Primary Examiner* — Edward F Urban
*Assistant Examiner* — Wassim Mahrouka
(74) *Attorney, Agent, or Firm* — Westman, Champlin & Koehler, P.A.

(57) ABSTRACT

According to the embodiments of the present application, there are proposed a method and electronic device for retrieving an image, and computer readable storage medium. The method includes: processing an image to be retrieved using a first neural network to determine a local feature vector of the image to be retrieved; processing the image to be retrieved using a second neural network to determine a global feature vector of the image to be retrieved; and determining, based on the local feature vector and the global feature vector, an image having a similarity to the image to be retrieved which is higher than a similarity threshold.

18 Claims, 4 Drawing Sheets

(56) References Cited

U.S. PATENT DOCUMENTS

2020/0160124 A1\* 5/2020 Fu .............................. G06T 7/11

FOREIGN PATENT DOCUMENTS

| CN | 106778527 | A | | 5/2017 |
|----|-----------|---|---|--------|
| CN | 108052861 | A | | 5/2018 |
| CN | 108229302 | A | | 6/2018 |
| CN | 108229344 | A | \* | 6/2018 |
| CN | 108229344 | A | | 6/2018 |
| CN | 108764316 | A | \* | 11/2018 |
| CN | 108960127 | A | | 12/2018 |
| CN | 109190687 | A | | 1/2019 |

OTHER PUBLICATIONS

First Office Action, including Search Report, for Chinese Patent Application No. 201910089288.7, dated Jul. 6, 2020, 16 pages.
Cong, Bai et al., "Optimization of deep convolutional neural network for large scale image retrieval", Journal Article, Neurocomputing 303 (2018) 60-67, dated Aug. 16, 2018, 8 pages.
Second Office Action, including Search Report, for Chinese Patent Application No. 201910089288.7, dated Dec. 10, 2020, 12 pages.

\* cited by examiner

METHOD AND ELECTRONIC DEVICE FOR RETRIEVING AN IMAGE AND COMPUTER READABLE STORAGE MEDIUM

CROSS-REFERENCE TO RELATED APPLICATION(S)

This application claims priority to the Chinese Patent Application No. 201910089288.7, filed on Jan. 29, 2019, which is incorporated herein by reference in its entirety.

TECHNICAL FIELD

The present disclosure relates to the field of image processing, and more particularly, to a method and electronic device for retrieving an image, and a computer readable storage medium.

BACKGROUND

Deep learning is one of the most important breakthroughs in the field of artificial intelligence in recent ten years. It has achieved great success in fields such as voice recognition, natural language processing, computer vision, image and video analysis, multi-media etc. For example, in conventional image retrieval techniques, underlying visual features of an image may typically be utilized for retrieval. However, due to a "semantic gap" problem between underlying features and high-level semantics, an effect of the image retrieval is not satisfactory.

In contrast, in deep learning-based image retrieval technology, a Convolutional Neural Network (CNN) may be used retrieving an image, has a powerful learning ability, and an efficient feature expression ability, and may extract information layer by layer from pixel-level raw data to abstract semantics concept. This makes it have outstanding advantages in extracting global features and context information of an image, and may form a more abstract high-level representation attribute category or feature by combining low-level features, and obtain a good effect of the image retrieval.

SUMMARY

According to a first aspect of the present disclosure, there is provided a method for retrieving an image. The method comprises: processing an image to be retrieved using a first neural network to determine a local feature vector of the image to be retrieved; processing the image to be retrieved using a second neural network to determine a global feature vector of the image to be retrieved; and determining, based on the local feature vector and the global feature vector, an image having a similarity to the image to be retrieved which is higher than a similarity threshold.

In some embodiments, the first neural network is trained using a plurality of training image data having different resolutions of a training image, and the first neural network is used for processing a plurality of image data to be retrieved having different resolutions of the image to be retrieved.

In some embodiments, a number of pixels of the shortest side of the plurality of training image data having different resolutions or the plurality of training image data having different resolutions comprises at least two of 256, 384, 512, 640, and 768. In some embodiments, the first neural network comprises the following convolutional layers: a first convolutional layer having 96 convolution kernels with a dimension of 11*11*3; a second convolutional layer having 256 convolution kernels with a dimension of 5*5*96; a third convolutional layer having 384 convolution kernels with a dimension of 3*3*256; a fourth convolutional layer having 384 convolution kernels with a dimension of 3*3*384; a fifth convolutional layer having 256 convolution kernels with a dimension of 3*3*384; a sixth convolutional layer having 4096 convolution kernels with a dimension of 1*1*256; and a seventh convolutional layer having 4096 convolution kernels with a dimension of 13*13*4096. In some embodiments, the first neural network further comprises a spatial transformer network subsequent to the seventh convolutional layer. In some embodiments, the first neural network further comprises a max pooling layer and a sum pooling layer subsequent to the seventh convolutional layer. In some embodiments, the first neural network is trained by using a loss function as follows: $L_f(ya, yp, yn) = \max(\|ya-yp\|_2^2 - \|ya-yn\|_2^2 + \alpha, 0)$, where $L_f$ represents a loss function for the first neural network, ya is a feature vector of a standard image, yp is a feature vector of a positive sample, yn is a feature vector of a negative sample, $\|\cdot\|_2^2$ represents a square of 2-norm of a vector, max( ) represents a maximum value solving function, and a is margin value. In some embodiments, $\alpha$ is defined as: $= 0.5*\|yp-yn\|_2^2$. In some embodiments, the step of processing an image to be retrieved using a first neural network to determine a local feature vector of the image to be retrieved comprises: processing, by using each convolutional layer in the first neural network, a plurality of image data to be retrieved having different resolutions of the image to be retrieved, and determining a plurality of receptive fields respectively having a maximum activation value in a plurality of feature maps for the respective resolutions as an output; and processing the plurality of receptive fields using a sum pooling layer in the first neural network to determine the local feature vector.

In some embodiments, the second neural network comprises the following convolutional layers: a first convolutional layer having 96 convolution kernels with a dimension of 11*11*3; a second convolutional layer having 256 convolution kernels with a dimension of 5*5*96; a third convolutional layer having 384 convolution kernels with a dimension of 3*3*256; a fourth convolutional layer having 384 convolution kernels with a dimension of 3*3*384; a fifth convolutional layer having 256 convolution kernels with a dimension of 3*3*384; a first fully connected layer with a dimension of 1*4096; and a second fully connected layer with a dimension of 1*4096. In some embodiments, the second neural network further has a spatial transformer network between the fifth convolutional layer and the first fully connected layer. In some embodiments, the loss function used for training the second neural network is a loss function as follows:

$$L_s(y1, y2, y) = \frac{(1-y)}{2}\|y1-y2\|_2^2 + \frac{y}{2}\max(m-\|y1-y2\|_2^2, 0),$$

where $L_s$ represents a loss function for the second neural network, y1 and y2 are feature vectors of two sample images respectively, y is a correct label indicating whether the two sample images are similar, $\|\cdot\|_2^2$ represents a square of 2-norm of a vector, max( ) represents a maximum value solving function, and m is a hyper-parameter. In some embodiments, the loss function used for training the first neural network and the second neural network at the same time is a loss function as follows:

$$L = L_t + \lambda L_s$$

$$L_t(ya, yp, yn) = \max(\|ya - yp\|_2^2 - \|ya - yn\|_2^2 + \alpha, 0)$$

$$L_s(y1, y2, y) = \frac{(1-y)}{2}\|y1 - y2\|_2^2 + \frac{y}{2}\max(m - \|y1 - y2\|_2^2, 0)$$

where L is a total loss function, $L_t$ represents a loss function for the first neural network, and $L_s$ represents a loss function for the second neural network, and where ya is a feature vector of a standard image, yp is a feature vector of a positive sample, yn is a feature vector of a negative sample, $\|\cdot\|_2^2$ represents a square of 2-norm of a vector, max( ) represents a maximum value solving function, α is a margin value, y1 and y2 are feature vectors of two sample images respectively, y is a correct label indicating whether two input images are similar, $\|\cdot\|_2^2$ represents a square of 2-norm of a vector, and m is a hyper-parameter.

According to a second aspect of the present disclosure, there is provided an electronic device for retrieving an image, comprising: a processor; and a memory having stored thereon instructions which, when executed by the processor, cause the processor to perform any method described above.

According to a third aspect of the present disclosure, there is provided a computer readable storage medium having stored thereon instructions. The instructions, when executed by one or more processors, cause the one or more processors to perform the method described above.

BRIEF DESCRIPTION OF THE ACCOMPANYING DRAWINGS

The above and other purposes, features and advantages of the present disclosure will become more apparent from the description of preferred embodiments of the present disclosure in conjunction with accompanying drawings, in which.

DETAILED DESCRIPTION

Figure 1:
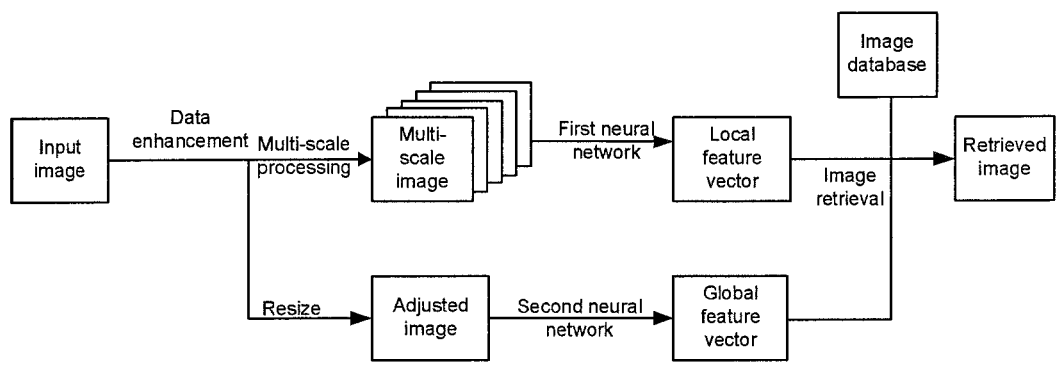
FIG. 1 is a schematic diagram illustrating an exemplary solution for retrieving an image according to an embodiment of the present disclosure.

The preferred embodiments of the present disclosure will be described in detail below with reference to the accompanying drawings, and details and functions which are not necessary for the present disclosure are omitted in the description to avoid confusion of the understanding of the present disclosure. In the present specification, the following various embodiments for describing the principles of the present disclosure are merely illustrative and should not be construed as limiting the scope of the present disclosure. The following description with reference to the accompanying drawings is intended to facilitate comprehensively understanding exemplary embodiments of the present disclosure which are defined by the claims and equivalents thereof. The following description comprises numerous specific details to assist the understanding, but these details should be considered as merely exemplary. Accordingly, it will be appreciated by those skilled in the art that various changes and modifications may be made to the embodiments described herein without departing from the scope and spirit of the present disclosure. In addition, descriptions of well-known functions and structures are omitted for clarity and conciseness. Further, the same reference numerals are used throughout the accompanying drawings for the same or similar functions and operations.

With the popularity of the Internet, image retrieval has become one of the important applications used in people's learning and life. For example, when a user makes a purchase through a network, the search may be performed by submitting a photo of an item to be purchased to a search engine. As another example, in the security field, when security personnel want to find someone who appears in a surveillance video, they may also search a database for the one who appears in the surveillance video through image retrieval. Therefore, the application field of image retrieval is very extensive As described above, with the recent advancement of research on neural networks, it has been found that features of an image may be learned and extracted using, for example, a Convolutional Neural Network (CNN), so that an efficient image retrieval function may be realized.

The convolutional neural network will be briefly described below. Studies by Hubel and Wiesel et al. in 1950 and 1960 showed that a visual cortex of cats and monkeys contained neurons which respond individually to small regions in the field of view. If eyes do not move, a region in the visual space where a single neuron is affected by visual stimuli is called a receptive field or reception field of the neuron. Adjacent neurons have similar and overlapping receptive fields. A size and a position of the receptive field are systematically altered on the cortex to form complete visual spatial mapping.

Inspired by this research, in the field of machine learning, a convolutional neural network (CNN or ConvNet for short) is proposed, which is a kind of feed-forward artificial neural network. Specifically, a mode of connection between neurons of the neural network is inspired by an animal visual cortex. A single neuron responds to a stimulus in a limited area of space, which is the receptive field described above. The respective receptive fields of different neurons partially overlap each other, so that they are arranged to form the entire field of view. A response of a single neuron to a stimulus in its receptive field may be mathematically approximated by convolution operations. Therefore, convolutional neural networks have a wide range of applications in the fields of image and video recognition, recommendation (for example, product recommendation of shopping websites, etc.), and natural language processing.

However, due to changes in factors such as viewing angle, distance, illumination, etc., different features may often be presented on images of the same object, which in turn makes the trained CNN unable to accurately recognize the object, or causes recognition errors due to an overfitting phenomenon. Therefore, there is a need for a solution which may improve the accuracy of image retrieval.

Hereinafter, an exemplary solution for retrieving an image according to an embodiment of the present disclosure will generally be described in conjunction with FIG. 1.

FIG. 1 is a schematic diagram illustrating an exemplary solution for retrieving an image according to an embodiment of the present disclosure. As shown in FIG. 1, generally, in the solution, an input image is processed through a local model and a global model respectively to obtain a local feature vector and a global feature vector of the input image respectively, and retrieval is performed in an image database according to the local feature vector and the global feature vector to finally obtain an image with a high similarity. In the local model, only regions having a high response of an activation function may be considered, thereby capturing local features in the original input image without considering global features. In addition, in the global model, the global features in the original input image may be captured, so that the global features may better express features at various levels of the input image together with the local features.

As shown in FIG. 1, it may be seen that the input image may firstly be subject to optional "data enhancement" processing. The data enhancement processing aims to increase diversity of samples, so that the subsequently trained neural network may fully capture various features, thereby preventing the features in the input image from being effectively captured. The data enhancement processing may specifically involve, for example, color jitter and/or left and right flipping etc. It should be illustrated that in some embodiments (for example, the embodiment shown in FIG. 1), the data enhancement processing does not involve a change in a scale (or resolution) of data.

The image data which has been subjected to the optional data enhancement processing may then pass through a first neural network (or a local feature extraction neural network) for local feature extraction and a second neural network (or a global feature extraction neural network) for global feature extraction respectively.

Specifically, in some embodiments, before the data which has been subjected to the data enhancement processing is processed by the first neural network, the data which has been subjected to the data enhancement processing may be subjected to multi-scale processing, to obtain multiple image data having different scales (or resolutions) of the same input image. The multi-scale processing is performed since a target object may have different sizes in images at different scales, which results in that the image retrieval does not have sufficiently high accuracy, and therefore multi-scale processing may be introduced to solve or at least alleviate this problem.

In the multi-scale processing, by taking a scale of 256 as an example, a short side of the input image may be adjusted to have 256 (pixels) while keeping an aspect ratio constant, so that a long side of the image changes therewith. In some embodiments, the multi-scale processing may have multiple scale transformations comprising, but not limited to, at least two of 256, 384, 512, 640, and 768, etc. However, it should be illustrated that the scale is not limited to the above, but any suitable scale may be used. In the embodiment shown, for example, in FIG. 1, all five scales are used, and therefore five image data having different scales of the input image may be obtained. However, it should be illustrated that this multi-scale processing is not necessarily performed; in other words, the first neural network may also process input images having various scales or resolutions. Further, although description is made by taking an example of an input image having a dimension of 227*227*3 in FIG. 2, in practice, the input image of the first neural network may be an input image having any appropriate dimension, such as an input image having a short side with a dimension of any one or more of 256, 384, 512, 640, and 768.

After image data at five (or more generally, multiple) different scales is obtained, the first neural network may be applied to the image data to extract a local feature vector of the input image. Next, a specific exemplary structure of the first neural network according to the embodiment of the present disclosure will be described in detail with reference to FIG. 1 in combination with FIG. 2.

Figure 2:
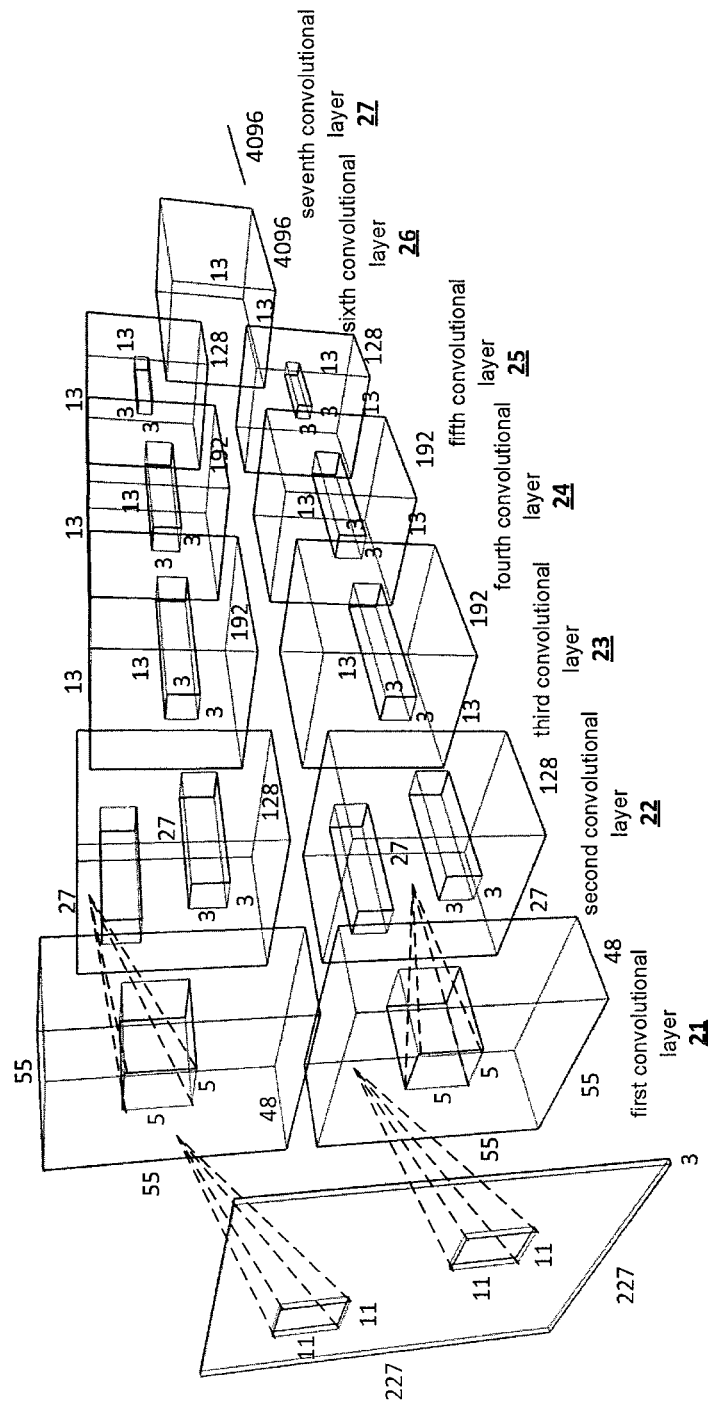
FIG. 2 is an exemplary schematic diagram illustrating a first neural network according to an embodiment of the present disclosure.

As shown in FIG. 2, the first neural network may generally comprise a plurality of convolutional layers (for example, a first convolutional layer 21 to a seventh convolutional layer 27 shown in FIG. 2), and these convolutional layers are generally a set of small neurons (which are also referred to in the mathematical sense as convolution kernels, wherein the small neurons and the convolution kernels may be used interchangeably unless otherwise stated) which are partially overlapped with each other. Moreover, in a context of the present disclosure, one of any two layers in a neural network which is closer to input data (or an input layer, such as the leftmost side of FIG. 2) is referred to as a "front" or "lower" layer, and the other of the two layers which is closer to output data (or an output layer, such as the rightmost side of FIG. 2) is referred to as a "back" or "upper" layer. Moreover, during training, verification, and/or use, a direction from the input layer to the output layer is referred to as forward or a forward direction, and a direction from the output layer to the input layer is referred to as backward or a backward direction.

By taking a first convolutional layer 21 shown in FIG. 2 as an example, these small neurons may process each local part (for example, a local part of the input image labeled with a height and a width of "11") of the input image. Outputs of these small neurons are then combined and arranged to form one output (referred to as feature mapping, such as a sectional view of a cuboid above the first convolutional layer 21 labeled with a height and width of "55") to obtain an output image which better express some features in the original image. At the same time, adjacent ones of neurons are partially arranged, which also causes the first neural network to have a degree of translational tolerance for features in the original image. In other words, even if a position of a feature in the original image changes in a translational manner within a certain tolerance, the first neural network may correctly recognize the feature. A detailed description of the convolutional layer will be given later and will not be discussed in detail here.

A next second convolutional layer 22 is also a convolutional layer which may perform further feature sampling on output data generated by the first convolutional layer 21 (and downsampled via a potentially existing pooling layer). Intuitively, features learned by the second convolutional layer 22 are globally larger than those learned by the first convolutional layer 21. Similarly, a subsequent convolutional layer is global to features of a previous convolutional layer.

As an intuitive example, it may be considered that the features learned by the first convolutional layer 21 may be subtle (or very local) features such as eye color, eye contour, eyelashes, nose contour, nose shadow, mouth contour, mouth color, etc., and the features learned by the second convolutional layer 22 for the output of the first convolutional layer 21 may be features of some slightly larger facial organs such as eyes (recognized according to, for example, eye color, eye contour, eyelash, etc.), a nose (determined according to, for example, nose contour, nose shadow, etc.)

and a mouth (determined according to, for example, mouth contour, mouth color etc.) etc., and these features are globally larger than those learned by the first convolutional layer 21. On the other hand, the third convolutional layer 23 to the seventh convolutional layer 27 etc. shown in FIG. 2 may learn more global features such as a human face (determined according to, for example, eyes, a nose, a mouth, etc.) according to the output of the second convolutional layer 22, and finally determines presence of the human face in the image or positions of feature points of the human face. Of course, the present disclosure is not limited thereto.

However, while the above examples are given in a way which may be understood by human beings, features learned by the first neural network in fact are usually not semantic features which may be understood by human beings, and instead are abstract features which usually cannot be understood by human beings at all. However, the computer may determine that this is one particular object or a type of particular objects by combining these features together. For the sake of understanding, it may be considered that a standard for a person to determine whether there is a human face may be to view whether there are human eyes, nose, mouth etc. in an image, a standard for another person to determine whether there is a human face may be to view whether there are eyebrows, a chin etc. in the image, and a standard for some strange persons to determine whether there is a human face may be to view whether there are glasses, a mask, earrings etc. in the image. The first neural network may be the strangest "person," and may use a series of features which cannot be described by human language at all to determine whether there is a human face and determine various parts of the human face, for example, a combination of some particular pixels.

Next, various basic constitutional units which may be included in the first neural network will be described in detail.

As shown in FIG. 2, each cuboid is actually a set of feature maps which are an input or an output of a certain convolutional layer. In other words, each convolutional layer is actually a mapping relationship from a previous cuboid to a next cuboid. As shown in FIG. 2, the first neural network may be formed by stacking a plurality of layers 21-27 (and other auxiliary layers not shown in FIG. 2) which may transform input data into output data. In FIG. 2, initial input data may be image data having height, width, and depth of 227, 227, and 3 respectively, which may represent image data of three channels (for example, red, white, and blue) having a resolution of 227*227. Therefore, the first convolutional layer 21 actually transforms a cuboid having height, width, and depth of 227, 227, and 3 into two cuboids having height, width, and depth of 55, 55, and 48, respectively (or a set of convolution kernels, which is described in detail, i.e., a convolutional layer). The convolutional layer in the neural network will be described in detail below.

Convolutional layers (for example, the first convolutional layer 21 to the seventh convolutional layer 27) are core constitutional units of the convolutional neural network. Parameters of such layers consist of a set of learnable convolution kernels (or convolution kernels for short), each of which has a small receptive field but extends along the entire depth of input data (for example, small cuboids labeled with height and width of 11, 5, 3 etc. as shown in FIG. 2). In a forward process, each convolution kernel is convoluted along a width and a height of the input data, a dot product between elements of the convolution kernel and the input data is calculated, and a two-dimensional activation map of the convolution kernel is generated. As a result, a network can learn convolution kernels which can be activated when a particular type of feature is viewed at a spatial position of the input.

Activation maps of all convolution kernels are stacked in the depth direction, to form full output data of the convolutional layer. Therefore, each element in the output data may be interpreted as output of a convolution kernel which views a small region in the input and shares parameters with other convolution kernels in the same activation map.

As described above, when a large-size input such as an image etc. is processed, it is impractical to connect a convolution kernel in a current layer to all the convolution kernels in a previous layer, since this network architecture does not take a spatial structure of data into account. The convolutional network takes advantages of spatial local correlation by enforcement of a local connection mode between convolution kernels of adjacent layers, that is, each convolution kernel is only connected to a small region of input data. A degree of connectivity is referred to as a parameter of a receptive field of the convolution kernel. The connection is local (along the width and height) in space, but always extends along the entire depth of the input data. This architecture ensures that the learned convolution kernels produce the strongest response to the spatial local input pattern.

As described above, multiple parameters such as a depth, a step, and zero padding, may also control a size of output data of the convolutional layer, in addition to a size of the input data (for example, the width and the height of the image in a case of two dimensions).

The depth of the output data controls a number of convolution kernels in the layer which are connected to the same region of the input data. For example, as shown in FIG. 2, the first convolutional layer 21 has a depth of 96 and the second convolutional layer 22 has a depth of 256. All of these convolution kernels will learn to be activated for different features in the input. For example, if the first convolutional layer 21 uses an original image as an input, different convolution kernels (i.e., different sectional views of the cuboid above the first convolutional layer 21 in FIG. 2) in the depth dimension may be activated when various directional sides or color blocks appear in the input data.

The step controls how depth columns for spatial dimensions (width and height) are allocated. For example, in FIG. 2, when the step is 4, input data of two adjacent convolution kernels in each sectional view of the cuboid in the first convolutional layer 21 differ by 4 spatial units. In a case where the convolution core has a dimension of 11×11×3, this results in overlapping between receptive fields of various columns. As another example, if a small step, for example, 1, is used, the receptive fields are highly overlapped and the resulting output data may have a larger spatial size.

In addition, in order to facilitate a convolution operation at an edge of an image, sometimes the input data may be filled with 0s at the edge of the input data, or in some other embodiments, zero padding may be substituted by populating with data on the opposite side, or in still some other embodiments, there is simply no zero padding, which makes the input data have a size which is slightly larger than that of the output data. A size of the zero padding is a third parameter. The zero padding provides control over a spatial size of the output data. Specifically, it is sometimes necessary to strictly maintain a spatial size of the input data, so that the zero padding must be used to maintain the spatial size.

As described above, parameter sharing solutions are used in the convolutional layer to control a number of free parameters. It relies on a reasonable assumption that if a feature is useful for calculation at a certain spatial position, it should also be useful for calculation at a different position. More generally, if a feature may appear at a position on the image, it should also possibly appear anywhere else. In other words, if a single two-dimensional slice at a depth is defined as a depth slice (i.e., there are only a width and a height, such as the sectional view described above as shown in FIG. 2), convolution kernels in each depth slice are constrained to use the same weights and offsets.

As all convolution kernels in a single depth slice may share the same parameters, a forward process for each depth slice in the convolutional layer may be calculated as a convolution of the weights of the convolution kernels with the input data (which is then optionally added with the offsets). For example, assuming that the input data and the convolution kernels which share the weights are 4×4 and 2×2 matrices respectively as follows, a result of the convolution operation with a step of 1 without zero padding and offsets is as shown in the following formula (1):

$$\begin{bmatrix} 1 & 1 & 1 & 0 \\ 0 & 1 & 1 & 1 \\ 0 & 0 & 1 & 1 \\ 0 & 1 & 1 & 0 \end{bmatrix} \otimes \begin{bmatrix} 1 & 0 \\ 0 & 1 \end{bmatrix} = \begin{bmatrix} 2 & 2 & 2 \\ 0 & 2 & 2 \\ 1 & 1 & 1 \end{bmatrix} \quad (1)$$

where $\otimes$ is a convolution operator.

It should be noted that sometimes the assumptions of parameter sharing are not necessarily required. This is especially true when the input image of the first neural network has specific structured features, wherein it is desired to learn completely different features at different spatial positions. In a scene such as facial feature recognition, it may be expected that different facial features such as eyes, hair, eyebrows, a nose, a mouth, ears, etc., should be learned at different positions. In this case, parameter sharing may not be required, and instead the layer is referred to as a locally connected layer or a locally connected convolutional layer. In these layers, various convolution kernels in the same depth slice do not share parameters, and such a non-shared convolutional layer consumes more memory, more training time, etc. than a shared convolutional layer which is configured similarly. However, as described above, it would be more preferable to use such non-shared convolutional layers as former layers in the first neural network when there is a strong structured configuration (for example, a human face) in the image.

For example, for each 2×2 local or receptive field of 4×4 input data in formula (1), multiple (up to 9 in this example) convolution kernels which do not share weights may be used to perform a convolution operation, which also results in 3×3 output data. However, as different convolution kernels are used, each element in the output data is usually different from a corresponding element in the output data in formula (1). However, in some special cases, depending on a training process of convolution kernels which do not share weights, all or a part of the convolution kernels which do not share weights may be the same, so that the output data may be completely or partly the same as the output data in formula (1).

Returning to FIG. 2, in some embodiments, the first neural network may have the following layers: a first convolutional layer 21 having 96 convolution kernels with a dimension of 11*11*3, a second convolutional layer 22 having 256 convolution kernels with a dimension of 5*5*96, a third convolutional layer 23 having 384 convolution kernels with a dimension of 3*3*256, a fourth convolutional layer 24 having 384 convolution kernels with a dimension of 3*3*384, a fifth convolutional layer 25 having 256 convolution kernels with a dimension of 3*3*384, a sixth convolutional kernel 26 having 4096 convolution kernels with a dimension of 1*1*256, and a seventh convolutional layer 27 having 4096 convolution kernels with a dimension of 13*13*4096.

By taking the first convolutional layer 21 as an example, in a case where there is no zero padding and a step is 4, 96 convolution kernels (which are 48 convolution kernels of an upper cuboid and 48 convolution kernels of a lower cuboid in the first convolutional layer 21 respectively) with height, width and depth of 11, 11, and 3 respectively are used in the first convolutional layer 21, to transform a cuboid with, for example, height, width and depth of 227, 227, and 3 respectively into two cuboids with height, width, and depth of 55, 55, and 48 respectively.

It should be illustrated here that the first convolutional layer 21 is divided into two groups to form the upper cuboid and the lower cuboid, mainly for parallelization of its calculation, so that its amount of calculation may be dispersed, for example, in two different GPUs. Therefore, the present disclosure is not limited thereto. In some other embodiments, the first convolutional layer 21 may not be divided into two groups, but only one group, or in still some other embodiments, the first convolutional layer 21 may be divided into two or more groups, which may all depend on the hardware used. In addition, this is similar for other convolutional layers or other layers. In addition, in a case where proper grouping is used, the occurrence of an overfitting phenomenon may further be effectively reduced, thereby improving the accuracy of image retrieval.

Further, there may be a pooling layer not shown in FIG. 2 between the first convolutional layer 21 and the second convolutional layer 22, which is mainly used for downsampling output data of the previous convolutional layer (for example, the first convolutional layer 21) while maintaining the features, so as to reduce the amount of calculation and prevent overfitting.

Another important concept in the convolutional neural network is pooling, which has a non-linear down-sampled form. There are several non-linear functions which are used to implement pooling, including at least max pooling, average pooling and sum pooling which are commonly used. In some embodiments, the max pooling divides an input image into a set of non-overlapped rectangles, and outputs a maximum value for each of such sub-regions. For example, if an input of a pooling layer is a 4×4 two-dimensional array (or matrix) as shown in Table 1, an output of the max pooling layer may be a 2×2 two-dimensional array (or matrix) as shown in Table 2:

TABLE 1

| 1 | 0 | 2 | 3 |
|---|---|---|---|
| 4 | 6 | 6 | 8 |
| 3 | 1 | 1 | 0 |
| 1 | 2 | 2 | 4 |

TABLE 2

| 6 | 3 |
|---|---|
| 8 | 4 |

Similarly, the sum pooling is to sum data of all the elements of each sub-region in Table 1, to obtain, for example, a two-dimensional array (or matrix) as shown in Table 3 below:

TABLE 3

| 11 | 19 |
|----|----|
| 7  | 7  |

Similarly, the average pooling averages the data of all elements of each sub-region in Table 1.

Further, although the data in Table 1 is divided and processed in a non-overlapping manner, the present disclosure is not limited thereto. In some other embodiments, for example, the embodiment of FIG. 2, overlapping pooling may be used. For example, assuming that each sub-region comprises data of 3×3 and each sub-region moves by a step of 2, there may be overlapping elements between two adjacent sub-regions.

Intuitively, this means that once a feature is found, its exact position is less important than its approximate positions relative to other features. A function of the pooling layer is to gradually reduce a spatial size of data, so as to reduce a number of parameters and computational complexity in the network and thus also prevent over-fitting. Pooling layers may be inserted periodically or in other modes between contiguous convolutional layers in the convolutional neural network architecture. For example, in the example shown in FIG. 2, max pooling layers may be provided between the first convolutional layer 21 and the second convolutional layer 22, between the second convolutional layer 22 and the third convolutional layer 23, between the fifth convolutional layer 25 and the sixth convolutional layer 26 and subsequent to the seventh convolutional layer 27 respectively, and a sum pooling layer may be provided subsequent to the seventh convolutional layer 27. A pooling operation provides a degree of translational invariance.

The pooling layer operates independently for each depth slice of input data and spatially adjusts its size. The most common form is a pooling layer of a convolution kernel with a size of 2×2, which is applied in width and height with 2 down-samples of each depth slice in the input as a step, thereby giving up 75% activation. Each of a maximum (MAX) operation or an average (AVG) operation takes a maximum value of four numbers or an average value of the four numbers. In addition, a size in the depth direction does not change. In addition, other pooling functions such as L2 norm pooling etc. may also be used. In addition, the pooling layer is not necessary, but is optional.

After the output of the first convolutional layer 21 is processed by the max pooling layer having a step of 2 and a sub-region with a size of 3×3, the output of the first convolutional layer 21 becomes two cuboids (or feature maps) having a dimension of 27*27*48. Next, in a case where a zero padding is 2 and a step is 1, 256 convolution kernels (which are 128 convolution kernels of an upper cuboid and 128 convolution kernels of a lower cuboid in the second convolutional layer 22 respectively) with height, width and depth of 5, 5, and 48 respectively are used in the second convolutional layer 22, to transform two cuboids with, for example, height, width and depth of 27, 27, and 48 respectively into two cuboids with height, width, and depth of 27, 27, and 128 respectively, as shown in FIG. 2, and so on, to finally obtain an output of the seventh convolutional layer 27, that is, a feature map with a dimension of 1×1× 4096 for a single-scale input image, which may be regarded as a feature vector having 4096 elements. It should be illustrated that for the sake of clarity and brevity of the accompanying drawing, the dotted line of mapping after the second convolutional layer 22 is omitted to avoid the accompanying drawing from being too complicated and misleading readers.

Further, although operations of the first convolutional layer 21 to the fifth convolutional layer 25 may be distributed on two physical processors as shown in FIG. 2, the present disclosure is not limited thereto. In fact, calculation of various layers (for example, the convolutional layer, the pooling layer, etc.) in the first neural network may be distributed across one or more different physical processors. In other words, calculation of the sixth convolutional layer 26 and the seventh convolutional layer 27 in FIG. 2 may also be distributed over multiple physical processors to achieve parallelized high speed calculation. Further, in some embodiments, during calculation in the third convolutional layer 23 of FIG. 2, convolution kernels on one physical processor may access feature maps processed on another physical processor. However, the present disclosure is not limited thereto, and other layers may perform similar processing, or the third convolutional layer 23 may also access only the feature maps on the same physical processor.

Further, the first neural network may further comprise a ReLU layer (more generally, an activation layer (sometimes also referred to as an excitation layer)) not shown in FIG. 2. ReLU is an abbreviation for a Rectified Linear Unit. This is a neuron layer to which an unsaturated activation function $f(x)=\max(0,x)$ applies. It increases non-linearity of a decision function and the entire network without affecting the receptive field of the convolutional layer.

Of course, in some other embodiments, other functions, such as a hyperbolic tangent function $f(x)=\tanh(x)$ and a Sigmoid function $f(x)=(1+e^{-x})^{-1}$, may also be used to increase the non-linearity. A ReLU function is more commonly used than other functions since it makes a training speed of the neural network be several times faster without having a significant impact on accuracy.

Although the ReLU layer (or the activation layer) is not explicitly shown in FIG. 2, in some embodiments, each convolutional layer may be followed by one ReLU layer, so that the non-linearity of the output of each convolutional layer increases, and a premature saturation state in a training phase is prevented.

Further, a conventional neural network generally comprises a fully connected layer. For example, global features in the neural network may be captured via the fully connected layer after the convolutional layer, the pooling layer and/or the activation layer. A convolution kernel in the fully connected layer has full connection for all activations in a previous layer, which is the same as in a conventional neural network. Therefore, its activation may be calculated using matrix multiplication and then using offsets.

In addition, an output of the fully connected layer may be a one-dimensional array in which each element represents a likelihood index that the image is classified into a certain category. In a context of facial feature recognition, the output may be used, for example, to determine whether there is a human face in the image, whether there are facial organs (for example, eyes, a nose, a mouth, eyebrows, a chin, hair, a tongue or even eyelashes, etc.) in the image and determine positions of these organs (if any) etc.

However, as described above, in the embodiment shown in FIG. 2, in order to capture local features of the image, the first neural network may not comprise a fully connected layer.

Although description is made by taking the input image having a dimension of 227*227*3 as an example in FIG. 2, as described above, a plurality of image data having different scales may be input. Then, for a plurality of image data at different scales, an output feature map may have a different dimension from that of an output feature vector in each layer. For example, assuming that the dimension of the feature vector is m×n×4096, the max pooling processing may be performed on the feature vector to generate a feature vector of 1×1×4096 representing a receptive field with the largest activation value. Then, sum pooling processing is performed on the plurality of feature vectors of the plurality of image data at different scales, to obtain a local feature vector. In other words, subsequent to the seventh convolutional layer 27, there may also be an additional max pooling layer, and sum pooling layers for image data at a plurality of different scales of the same input image. In addition, the local feature vector obtained through the sum pooling layer may optionally be subjected to normalization processing to facilitate subsequent processing.

Returning to FIG. 1, the image data at a plurality of different scales of the input image may be processed by using the first neural network as described above, to obtain a local feature vector of the input image. However, as also described above, in order to taking the global features of the input image into consideration, it is also necessary to perform global feature capture processing on the input image, and therefore it is necessary to process the input image using the second neural network. Since the neural network for global processing usually needs to use a fully connected layer, it is necessary to unify the scales of the input image. For example, all input images may be adjusted to image data having a specified scale or resolution. For example, the input images may be adjusted to input images of 227*227*3. The resized image may be processed by the second neural network to obtain a global feature vector of the input image.

Next, a specific exemplary structure of the second neural network according to an embodiment of the present disclosure will be described in detail with reference to FIG. 1 in combination with FIG. 3.

Figure 3:
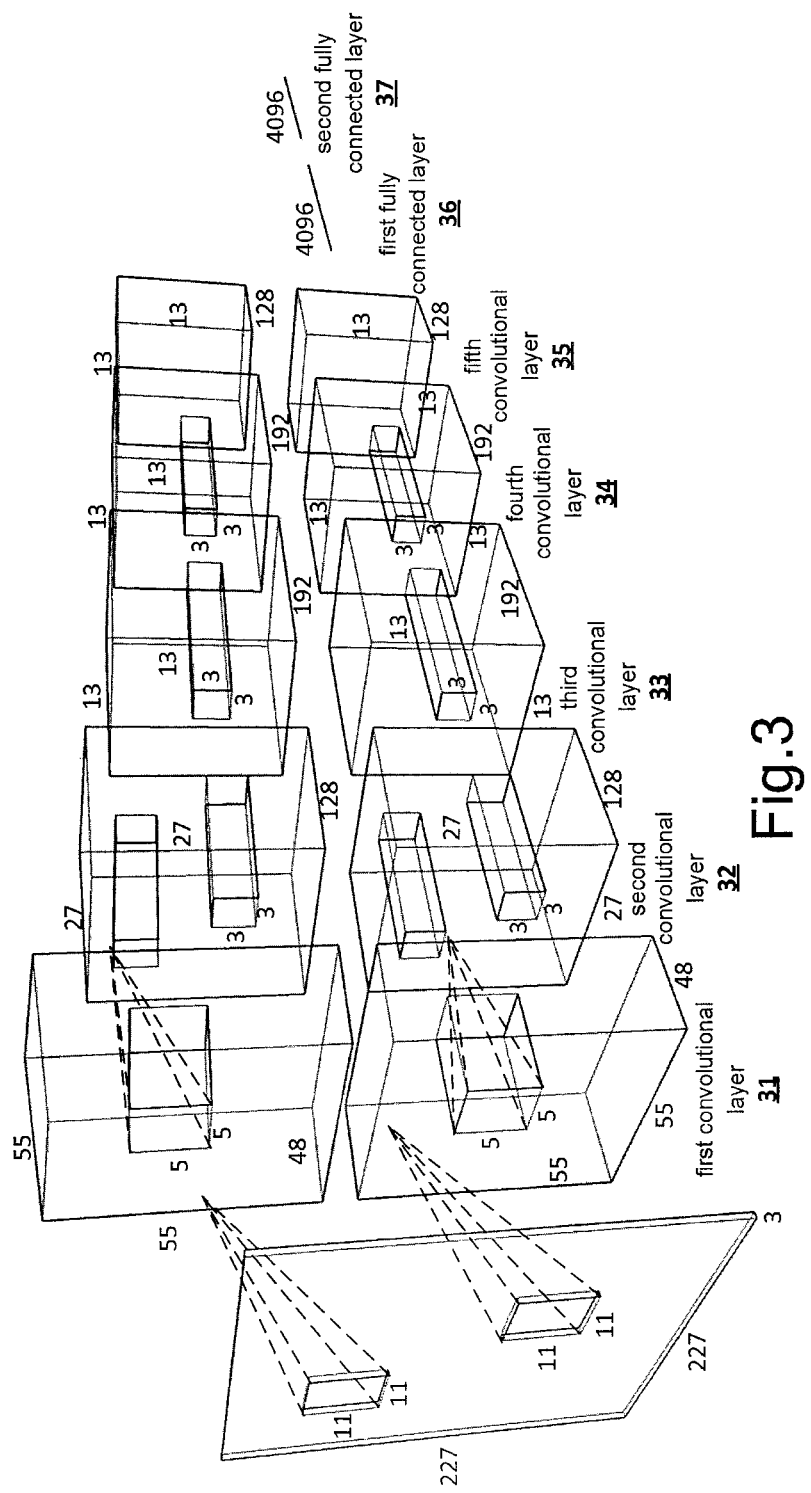
FIG. 3 is an exemplary schematic diagram illustrating a second neural network according to an embodiment of the present disclosure.

As shown in FIG. 3, the second neural network may also comprise a plurality of convolutional layers (for example, the first convolutional layer 21 to the fifth convolutional layer 25 shown in FIG. 3), which is similar to the first neural network shown in FIG. 2. However, the second neural network differs from the first neural network in that it does not have the sixth convolutional layer and the seventh convolutional layer, but instead it comprises a first fully connected layer 36 and a second fully connected layer 37. Therefore, the second neural network may comprise the following layers: a first convolutional layer 31 having 96 convolution kernels with a dimension of 11*11*3, a second convolutional layer 32 having 256 convolution kernels with a dimension of 5*5*96, a third convolutional layer 33 having 384 convolution kernels with a dimension of 3*3*256, a fourth convolutional layer 34 having 384 convolution kernels with a dimension of 3*3*384, a fifth convolutional layer 35 having 256 convolution kernels with a dimension of 3*3*384, a first fully connected layer 36 having a dimension of 1*4096, and a second fully connected layer 37 having a dimension of 1*4096.

Since the first five convolutional layers 31 to 35 are similar to the first convolutional layer 21 to the fifth convolutional layer 25 in the first neural network respectively, detailed description thereof will not be given here. Hereinafter, two fully connected layers 36 and 37 will be mainly described.

As described above, global feature capture in the neural network may be achieved via a fully connected layer after, for example, a convolutional layer, a pooling layer, and/or an activation layer. The convolution kernel in the fully connected layer has full connection for all activations in a previous layer. Therefore, matrix multiplication and then offset may be used to calculate its activation. As shown in FIG. 3, after passing through the fifth convolutional layer 35, two sets of feature maps with a dimension of 13×13×256 are obtained; after the processing of the first fully connected layer 36, a feature map of 1×1×4096 is obtained, and then after the processing of the second fully connected layer 37, a feature map of 1×1×4096 is obtained, which may also be regarded as a feature vector of 1×4096.

Returning to FIG. 1, a global feature vector of the input image may be obtained by the processing of the second neural network. However, an image having a similarity to the input image which is higher than a similarity threshold may be determined based on the local feature vector and the global feature vector of the input image. For example, as shown in FIG. 1, respective similarities between the local feature vector and the global feature vector of the input image and the local feature vector and the global feature vector of each image in the image database may be calculated, and a weighted sum of the two calculated similarities is calculated to obtain a final similarity measure. The similarity may be calculated using methods, for example, a cosine similarity method, a maximum closeness method, etc. Moreover, in some embodiments, after the final similarity measure between the input image and each image is determined, the images may be returned or output in a similarity order, so that users may see the ordered retrieval results. In some other embodiments, only those retrieval results having a similarity higher than a certain threshold may be returned, or only those retrieval results which are completely matched may be returned.

Further, the first neural network and the second neural network may use different loss functions during training. For example, the first neural network may be trained using a triple loss function as follows:

$$L_t(ya, yp, yn) = \max(\|ya-yp\|_2^2 - \|ya-yn\|_2^2 + \alpha, 0),$$

where $L_t$ represents a loss function for the first neural network, ya is a feature vector of a standard image, yp is a feature vector of a positive sample, yn is a feature vector of a negative sample, $\|\cdot\|_2^2$ represents a square of 2-norm of a vector, max( ) represents a maximum value solving function, and $\alpha$ is margin value. The triplet loss function is typically used to compare small differences, which may enable the first neural network to distinguish between a positive sample ya and a negative sample yp with small differences, or in other words, a distance between ya and yp is as small as possible, while a distance between ya and yn is as large as possible.

In addition, the triplet loss function may be derived separately with respect to ya, yp, and yn, which may well describe a similarity difference between the standard image and the positive and negative samples. In addition, a value of a in the above formula is critical, and the smaller it is, the easier the loss is to approach zero. A result obtained by this training is not able to distinguish similar images very well. When it is large, the loss is likely to have a large value and it is difficult to approach 0. It may therefore be designed to be adaptive to perform calculation according to each difference between positive and negative samples. Thus, in some embodiments, a may be defined as: $\alpha=0.5*\|yp-yn\|_2^2$.

Moreover, in some embodiments, a loss function used for training the second neural network may be a loss function as follows:

$$L_s(y1, y2, y) = \frac{(1-y)}{2}\|y1-y2\|_2^2 + \frac{y}{2}\max(m-\|y1-y2\|_2^2, 0),$$

where $L_s$ represents a loss function for the second neural network, y1 and y2 are feature vectors of two sample images respectively, y is a correct label indicating whether the two sample images are similar, $\|\bullet\|_2^2$ represents a square of 2-norm of a vector, max( ) represents a maximum value solving function, and m is a margin value.

In some embodiments, y is 1 when two sample images are similar, and y is 0 when the two sample images are not similar. The gradient descent method may be used to perform derivation with respect to y1 and y2 respectively, and the back propagation process and the convolutional neural network are the same. It should be illustrated that since the local model uses the triple loss function, the final global model is a loss weighted sum of an anchor image and the positive and negative samples.

Further, the above is the respective loss functions used for training the first neural network and the second neural network respectively. However, in some embodiments, joint training or simultaneous training may be performed for the first neural network and the second neural network. A loss function used at this time may be a loss function as follows:

$$L=L_t+\lambda L_s$$

where L is a total loss function, $L_t$ represents a loss function (for example, $L_t$ as defined above) for the first neural network, and $L_s$ represents a loss function (for example, $L_s$ as defined above) for the second neural network.

In addition, in some other embodiments, the classification accuracy may also be improved by using a Spatial Transformer Network (STN). The STN allows the neural network to explicitly utilize spatial information of data. The network does not require calibration of key points, and may adaptively perform spatial transformation and alignment (comprising translation, scaling, rotation, and other geometric transformations, etc.) of the data according to classification or other tasks. In some embodiments, this network may be added to other convolutional networks to improve the accuracy of the classification. In some embodiments, the STN is typically related to a size of a feature map, where the feature map has a size of 13*13*256, and has three convolutional layers and one fully connected layer. More specifically, in some embodiments, the STN may comprise a first convolutional layer having 50 5*5 convolution kernels, a second convolutional layer having 30 5*5 convolution kernels, a third convolutional layer having 20 5*5 convolution kernels, and a fully connected layer. The STN has six outputs, i.e., affine parameters.

In general, the STN learns how to transform the input data during the training phase, which is more beneficial to the model. Then, during the test phase, the trained network is used to perform corresponding transformation on the input data, thereby improving the recognition rate of the model. For the first neural network, the STN may be placed after the output of the last convolutional layer (for example, the seventh convolutional layer 27), so that the final output is a spatially transformed feature, thereby reducing poor effects on the retrieval result due to spatial transformation. For the second neural network, the STN may also be placed after the output of the last convolutional layer (for example, the fifth convolutional layer 35), so that the final output is a spatially transformed feature, thereby reducing poor effects on the retrieval result due to spatial transformation.

Further, although the first five convolutional layers of the first neural network shown in FIG. 2 and the convolutional layer used in the second neural network shown in FIG. 3 are similar to the convolutional layers used in AlexNet, the present disclosure is not limited thereto, and convolutional layers with other configurations, such as convolutional layers of networks such as VGG, Inceptio_v3, ResNet, etc., may be used. In addition, in some other embodiments, whether to use the pooling layer/activation layer/normalized layer and/or what kind of pooling layer/activation layer/normalized layer is used is also optional, and is not limited to the specific embodiments described above. Moreover, in some other embodiments, what training data/verification data etc. is used is also optional and is not limited to the specific data described above.

In the above, the solution for retrieving an image according to the embodiment of the present disclosure has been described in detail in conjunction with FIGS. 1 to 3. The above first neural network and the above second neural network are used to extract the local feature vector and the global feature vector respectively, which are used in combination with the targeted loss function design (comprising a adaptive margin value a therein) and the spatial transformer network, which may significantly improve the accuracy of image retrieval and improve the training efficiency of the neural network.

Figure 4:
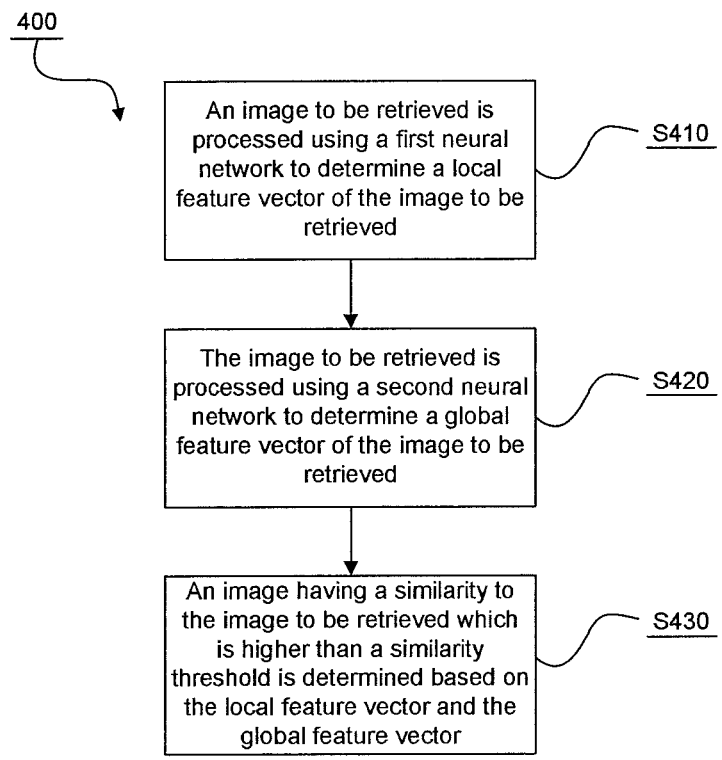
FIG. 4 is a flowchart illustrating an exemplary method for retrieving an image according to an embodiment of the present disclosure.

FIG. 4 is a flowchart illustrating a method 400 for retrieving an image performed in an electronic device (for example, a device 500 in FIG. 5) according to an embodiment of the present disclosure. As shown in FIG. 4, the method 400 may comprise steps S410, S420, and S430. According to the present disclosure, some of the steps of method 400 may be performed separately or in combination, and may be performed in parallel or sequentially, and is not limited to a specific order of operations illustrated in FIG. 4.

The method 400 starts at step S410. In step S410, an image to be retrieved may be processed using a first neural network to determine a local feature vector of the image to be retrieved.

In step S420, the image to be retrieved may be processed using a second neural network to determine a global feature vector of the image to be retrieved.

In step S430, an image having a similarity to the image to be retrieved which is higher than a similarity threshold may be determined based on the local feature vector and the global feature vector.

In some embodiments, the first neural network is trained using a plurality of training image data having different resolutions of a training image, and the first neural network is used for processing a plurality of image data to be retrieved having different resolutions of the image to be retrieved. In some embodiments, a number of pixels of the shortest side of the plurality of training image data having different resolutions or the plurality of training image data having different resolutions may comprise at least two of 256, 384, 512, 640, and 768. In some embodiments, the first neural network may comprise the following layers: a first convolutional layer having 96 convolution kernels with a dimension of 11*11*3; a second convolutional layer having 256 convolution kernels with a dimension of 5*5*96; a third convolutional layer having 384 convolution kernels with a dimension of 3*3*256; a fourth convolutional layer having 384 convolution kernels with a dimension of 3*3*384; a fifth convolutional layer having 256 convolution kernels with a dimension of 3*3*384; a sixth convolutional layer having 4096 convolution kernels with a dimension of 1*1*256; and a seventh convolutional layer having 4096 convolution kernels with a dimension of 13*13*4096. In some embodiments, the first neural network may further comprise a spatial transformer network subsequent to the seventh convolutional layer. In some embodiments, the first neural network may further comprise a max pooling layer and a sum pooling layer subsequent to the seventh convolutional layer. In some embodiments, the first neural network may be trained by using a loss function as follows: $L_t(ya, yp, yn) = \max(\|ya-yp\|_2^2 - \|ya-yn\|_2^2 + \alpha, 0)$, where $L_t$ represents a loss function for the first neural network, ya is a feature vector of a standard image, yp is a feature vector of a positive sample, yn is a feature vector of a negative sample, $\|\cdot\|_2^2$ represents a square of 2-norm of a vector, max( ) represents a maximum value solving function, and $\alpha$ is margin value. In some embodiments, a may be defined as: $\alpha=0.5*\|yp-yn\|_2^2$. In some embodiments, step S410 may comprise: processing, by using each convolutional layer in the first neural network, a plurality of image data to be retrieved having different resolutions of the image to be retrieved, and determining a plurality of receptive fields respectively having a maximum activation value in a plurality of feature maps for the respective resolutions as an output; and processing the plurality of receptive fields using a sum pooling layer in the first neural network to determine the local feature vector. In some embodiments, the second neural network may comprise the following layers: a first convolutional layer having 96 convolution kernels with a dimension of 11*11*3; a second convolutional layer having 256 convolution kernels with a dimension of 5*5*96; a third convolutional layer having 384 convolution kernels with a dimension of 3*3*256; a fourth convolutional layer having 384 convolution kernels with a dimension of 3*3*384; a fifth convolutional layer having 256 convolution kernels with a dimension of 3*3*384; a first fully connected layer with a dimension of 1*4096; and a second fully connected layer with a dimension of 1*4096. In some embodiments, the second neural network may further have a spatial transformer network between the fifth convolutional layer and the first fully connected layer. In some embodiments, the loss function used for training the second neural network may be a loss function as follows:

$$L_s(y1, y2, y) = \frac{(1-y)}{2}\|y1-y2\|_2^2 + \frac{y}{2}\max(m-\|y1-y2\|_2^2, 0),$$

where $L_s$ represents a loss function for the second neural network, y1 and y2 are feature vectors of two sample images respectively, y is a correct label indicating whether the two sample images are similar, $\|\cdot\|_2^2$ represents a square of 2-norm of a vector, max( ) represents a maximum value solving function, and m is a hyper-parameter. In some embodiments, the loss function used for training the first neural network and the second neural network at the same time may be a loss function as follows:

$$L = L_t + \lambda L_s$$
$$L_t(ya, yp, yn) = \max(\|ya-yp\|_2^2 - \|ya-yn\|_2^2 + \alpha, 0)$$
$$L_s(y1, y2, y) = \frac{(1-y)}{2}\|y1-y2\|_2^2 + \frac{y}{2}\max(m-\|y1-y2\|_2^2, 0)$$

where L is a total loss function, $L_t$ represents a loss function for the first neural network, and $L_s$ represents a loss function for the second neural network, and where ya is a feature vector of a standard image, yp is a feature vector of a positive sample, yn is a feature vector of a negative sample, $\|\cdot\|_2^2$ represents a square of 2-norm of a vector, max( ) represents a maximum value solving function, $\alpha$ is a margin value, y1 and y2 are feature vectors of two sample images respectively, y is a correct label indicating whether two input images are similar, $\|\cdot\|_2^2$ represents a square of 2-norm of a vector, and m is a hyper-parameter.

Figure 5:
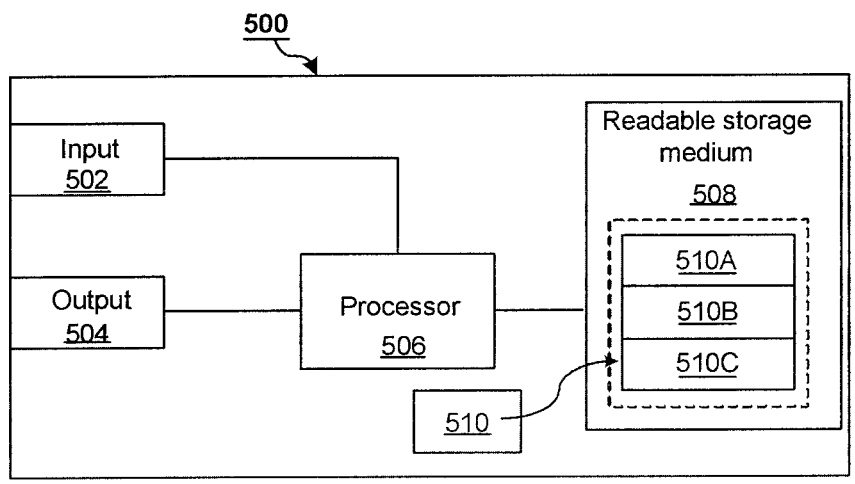
FIG. 5 is a block diagram illustrating an exemplary hardware arrangement of an electronic device for retrieving an image according to an embodiment of the present disclosure.

FIG. 5 is a block diagram illustrating an exemplary hardware arrangement 500 of an electronic device for retrieving an image according to an embodiment of the present disclosure. The hardware arrangement 500 comprises a processor 506 (for example, a Digital Signal Processor (DSP)). The processor 506 may be a single processing unit or a plurality of processing units for performing different actions of the flow described herein. The arrangement 500 may also comprise an input unit 502 for receiving signals from other entities, and an output unit 504 for providing signals to other entities. The input unit 502 and the output unit 504 may be arranged as a single entity or separate entities.

In addition, the arrangement 500 may comprise at least one readable storage medium 508 in a form of non-volatile or volatile memory, such as an Electrically Erasable Programmable Read-Only Memory (EEPROM), a flash memory, and/or a hard disk driver. The readable storage medium 508 comprises a computer program 510 which includes codes/computer readable instructions that, when executed by the processor 506 in the arrangement 500, cause the hardware arrangement 500 and/or the electronic device including the hardware arrangement 500 to perform, for example, flows described above in connection with FIGS. 1-4 and any variations thereof.

The computer program 510 may be configured with computer program codes having, for example, architecture of computer program modules 510A-510C. Therefore, in an example embodiment when the hardware arrangement 500 is used in the electronic device, the codes in the computer program of the arrangement 500 comprise a module 510A for processing an image to be retrieved using a first neural network to determine a local feature vector of the image to be retrieved. The codes in the computer program also comprise a module 510B for processing the image to be retrieved using a second neural network to determine a global feature vector of the image to be retrieved. The codes in the computer program also comprise a module 510C for determining, based on the local feature vector and the global feature vector, an image having a similarity to the image to be retrieved which is higher than a similarity threshold.

The computer program modules may substantially perform the various actions in the flow shown in FIGS. 1-4 to simulate the electronic device. In other words, when different computer program modules are executed in the processor 506, they may correspond to different functional units in the electronic device.

Although the following code means in the embodiments disclosed above in conjunction with FIG. 5 are implemented as computer program modules that, when executed by the processor 506, cause the hardware arrangement 500 to perform the actions described above in connection with FIGS. 1-4, in alternative embodiments, at least one of the code means may be implemented at least in part as a hardware circuit.

The processor may be a single Central Processing Unit (CPU), but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a Random Access Memory (RAM), a Read Only Memory (ROM), and an EEPROM, and the computer program module may, in an alternative embodiment, be distributed to different computer program products in a form of memory within the UE.

With the method and electronic device for retrieving an image, and the computer readable storage medium according to the embodiments of the present disclosure, image retrieval may be performed more accurately and efficiently, and the training efficiency of the neural network may be improved.

The present disclosure has thus far been described in connection with preferred embodiments. It is to be understood that various other changes, substitutions and additions can be made by those skilled in the art without departing from the spirit and scope of the present disclosure. Accordingly, the scope of the present disclosure is not limited to the specific embodiments described above, but should be defined by the appended claims.

In addition, functions described herein as being implemented by only hardware, only software and/or firmware can also be implemented by means of dedicated hardware, a combination of general purpose hardware and software, etc. For example, functions described as being implemented by dedicated hardware (for example, a Field Programmable Gate Array (FPGA), an Application Specific Integrated Circuit (ASIC), etc.) can be implemented by general purpose hardware (for example, a Central Processing Unit (CPU), a Digital Signal Processor (DSP)) in combination with software, and vice versa.

I claim:

1. A method for retrieving an image, comprising:
processing an image to be retrieved using a first neural network to determine a local feature vector of the image to be retrieved;
processing the image to be retrieved using a second neural network to determine a global feature vector of the image to be retrieved; and
determining, based on the local feature vector and the global feature vector, an image having a similarity to the image to be retrieved which is higher than a similarity threshold;
wherein the first neural network is trained by using a loss function as follows:

$$L_t(ya,yp,yn)=\max(\|ya-yp\|_2^2-\|ya-yn\|_2^2+\alpha,0),$$

where $L_t$ represents a loss function for the first neural network, ya is a feature vector of a standard image, yp is a feature vector of a positive sample, yn is a feature vector of a negative sample, $\|\bullet\|_2^2$ represents a square of 2-norm of a vector, max( ) represents a maximum value solving function, and $\alpha$ is margin value.

2. The method according to claim 1, wherein the first neural network is trained using a plurality of training image data having different resolutions of a training image, and the first neural network is used for processing a plurality of image data to be retrieved having different resolutions of the image to be retrieved.

3. The method according to claim 2, wherein a number of pixels of the shortest side of the plurality of training image data having different resolutions or the plurality of training image data having different resolutions comprises at least two of 256, 384, 512, 640, and 768.

4. The method according to claim 2, wherein the first neural network comprises the following convolutional layers:
a first convolutional layer having 96 convolution kernels with a dimension of 11*11*3;
a second convolutional layer having 256 convolution kernels with a dimension of 5*5*96;
a third convolutional layer having 384 convolution kernels with a dimension of 3*3*256;
a fourth convolutional layer having 384 convolution kernels with a dimension of 3*3*384;
a fifth convolutional layer having 256 convolution kernels with a dimension of 3*3*384;
a sixth convolutional layer having 4096 convolution kernels with a dimension of 1*1*256; and
a seventh convolutional layer having 4096 convolution kernels with a dimension of 13*13*4096.

5. The method according to claim 4, wherein the first neural network further comprises a max pooling layer and a sum pooling layer subsequent to the seventh convolutional layer.

6. The method according to claim 1, wherein $\alpha$ is defined as:

$$\alpha=0.5*\|yp-yn\|_2^2$$

7. The method according to claim 4, wherein the step of processing an image to be retrieved using a first neural network to determine a local feature vector of the image to be retrieved comprises:
processing, by using each convolutional layer in the first neural network, a plurality of image data to be retrieved having different resolutions of the image to be retrieved, and determining a plurality of receptive fields respectively having a maximum activation value in a plurality of feature maps for the respective resolutions as an output; and
processing the plurality of receptive fields using a sum pooling layer in the first neural network to determine the local feature vector.

8. The method according to claim 1, wherein the second neural network comprises the following convolutional layers:
a first convolutional layer having 96 convolution kernels with a dimension of 11*11*3;
a second convolutional layer having 256 convolution kernels with a dimension of 5*5*96;
a third convolutional layer having 384 convolution kernels with a dimension of 3*3*256;
a fourth convolutional layer having 384 convolution kernels with a dimension of 3*3*384;

a fifth convolutional layer having 256 convolution kernels with a dimension of 3*3*384;
a first fully connected layer with a dimension of 1*4096; and
a second fully connected layer with a dimension of 1*4096.

9. The method according to claim 8, wherein the second neural network further has a spatial transformer network between the fifth convolutional layer and the first fully connected layer.

10. The method according to claim 1, wherein the loss function used for training the second neural network is a loss function as follows:

$$L_s(y1, y2, y) = \frac{(1-y)}{2}\|y1-y2\|_2^2 + \frac{y}{2}\max(m-\|y1-y2\|_2^2, 0),$$

where $L_s$ represents a loss function for the second neural network, y1 and y2 are feature vectors of two sample images respectively, y is a correct label indicating whether the two sample images are similar, $\|\bullet\|_2^2$ represents a square of 2-norm of a vector, max( ) represents a maximum value solving function, and m is a margin value.

11. The method according to claim 2, wherein the loss function used for training the first neural network and the second neural network at the same time is a loss function as follows:

$$L = L_t + \lambda L_s$$

$$L_t(ya, yp, yn) = \max(\|ya-yp\|_2^2 - \|ya-yn\|_2^2 + \alpha, 0)$$

$$L_s(y1, y2, y) = \frac{(1-y)}{2}\|y1-y2\|_2^2 + \frac{y}{2}\max(m-\|y1-y2\|_2^2, 0)$$

where L is a total loss function, $L_t$ represents a loss function for the first neural network, and $L_s$ represents a loss function for the second neural network, and where ya is a feature vector of a standard image, yp is a feature vector of a positive sample, yn is a feature vector of a negative sample, $\|\bullet\|_2^2$ represents a square of 2-norm of a vector, max( ) represents a maximum value solving function, α is a margin value, y1 and y2 are feature vectors of two sample images respectively, y is a correct label indicating whether two input images are similar, $\|\bullet\|_2^2$ represents a square of 2-norm of a vector, and m is a margin value.

12. An electronic device for retrieving an image, comprising:
a processor; and
a memory having stored thereon instructions which, when executed by the processor, cause the processor to perform the following steps:
processing an image to be retrieved using a first neural network to determine a local feature vector of the image to be retrieved;
processing the image to be retrieved using a second neural network to determine a global feature vector of the image to be retrieved; and
determining, based on the local feature vector and the global feature vector, an image having a similarity to the image to be retrieved which is higher than a similarity threshold; and the method further comprises training the first neural network by using a loss function as follows:

$$L_t(ya,yp,yn)=\max(\|ya-yp\|_2^2-\|ya-yn\|_2^2+\alpha,0),$$

where $L_t$ represents a loss function for the first neural network, ya is a feature vector of a standard image, yp is a feature vector of a positive sample, yn is a feature vector of a negative sample, $\|\bullet\|_2^2$ represents a square of 2-norm of a vector, max( ) represents a maximum value solving function, and α is margin value.

13. The electronic device according to claim 12, wherein the first neural network is trained using a plurality of training image data having different resolutions of a training image, and the first neural network is used for processing a plurality of image data to be retrieved having different resolutions of the image to be retrieved.

14. The electronic device according to claim 12, wherein the step of processing an image to be retrieved using a first neural network to determine a local feature vector of the image to be retrieved comprises:
processing, by using each convolutional layer in the first neural network, a plurality of image data to be retrieved having different resolutions of the image to be retrieved, and determining a plurality of receptive fields respectively having a maximum activation value in a plurality of feature maps for the respective resolutions as an output; and
processing the plurality of receptive fields using a sum pooling layer in the first neural network to determine the local feature vector.

15. The electronic device according to claim 12, wherein the loss function used for training the second neural network is a loss function as follows:

$$L_s(y1, y2, y) = \frac{(1-y)}{2}\|y1-y2\|_2^2 + \frac{y}{2}\max(m-\|y1-y2\|_2^2, 0),$$

where $L_s$ represents a loss function for the second neural network, y1 and y2 are feature vectors of two sample images respectively, y is a correct label indicating whether the two sample images are similar, $\|\bullet\|_2^2$ represents a square of 2-norm of a vector, max( ) represents a maximum value solving function, and in is a margin value.

16. A non-transitory computer readable storage medium having stored thereon instructions which, when executed by one or more processors, cause the one or more processors to perform the following steps:
processing an image to be retrieved using a first neural network to determine a local feature vector of the image to be retrieved;
processing the image to be retrieved using a second neural network to determine a global feature vector of the image to be retrieved; and
determining, based on the local feature vector and the global feature vector, an image having a similarity to the image to be retrieved which is higher than a similarity threshold; and
training the first neural network by using a loss function as follows:

$$L_t(ya,yp,yn)=\max(\|ya-yp\|_2^2-\|ya-yn\|_2^2+\alpha,0),$$

where $L_t$ represents a loss function for the first neural network, ta is a feature vector of a standard image, yp is a feature vector of a positive sample, yn is a feature vector of a negative sample, $\|\bullet\|_2^2$ represents a square of 2-norm of a vector, max( ) represents a maximum value solving function, and α is margin value.

17. The non-transitory computer readable storage medium according to claim 16, wherein the first neural network is trained using a plurality of training image data having different resolutions of a training image, and the first neural network is used for processing a plurality of image data to be retrieved having different resolutions of the image to be retrieved.

18. The non-transitory computer readable storage medium according to claim 16, wherein the step of processing an image to be retrieved using a first neural network to determine a local feature vector of the image to be retrieved comprises:
   processing, by using each convolutional layer in the first neural network, a plurality of image data to be retrieved having different resolutions of the image to be retrieved, and determining a plurality of receptive fields respectively having a maximum activation value in a plurality of feature maps for the respective resolutions as an output; and
   processing the plurality of receptive fields using a sum pooling layer in the first neural network to determine the local feature vector.

* * * * *